Oct. 19, 1943.    G. VON PAZSICZKY ET AL    2,331,945
PRODUCTION OF CURLED MINERAL FIBERS
Filed Feb. 3, 1939

GEDEON VON PAZSICZKY
INVENTOR

*Carl G. Staelin*
ATTORNEY

Patented Oct. 19, 1943

2,331,945

UNITED STATES PATENT OFFICE 2,331,945

PRODUCTION OF CURLED MINERAL FIBERS

Gedeon von Pazsiczky, Hamburg-Wandsbek, Germany; vested in the Alien Property Custodian Application February 3, 1939, Serial No. 254,379
In Germany February 4, 1938

9 Claims. (Cl. 49—1)

Curled glass fibers, known in certain countries under the name of "fairy-hair," have already been produced by heating two rods of glass with different coefficients of expansion to melting temperature, causing the molten masses to unite and drawing them to fibers or threads by means of a rotating drum or other mechanical means. It has also been proposed to make curled fibers by melting glasses with different coefficients of expansion in separate compartments of a revolving drum-shaped receptacle and causing streams of these different molten glasses to be delivered through adjacent outlet orifices of the receptacle and drawn to fibers by the action of centrifugal force.

The curled fibers made in accordance with the above methods had a comparatively large diameter and could not be used for textile purposes. The curl was too regular and its waves or windings too long so that it was much unlike to the irregular curl of natural textile fibers.

Now, it is the object of my invention to make curled artificial mineral fibers of very small diameter which lend themselves admirably for being worked to textile products by the customary processes and machines, this object being attained by adding to a main mass of molten glass small quantities of another glass mass with a coefficient of expansion different from that of the first-said glass in such a manner that the ratio of mixture of the two glasses changes constantly so that the fibers or threads formed from this glass mixture show an irregular curl.

The addition of the secondary glass may be effected by introducing small quantities of such glass in solid or molten form either continuously or intermittently into the melting receptacle holding the main mass of glass. The secondary glass is preferably introduced into the melting receptacle near one of its walls, thereby allowing only imperfect mixing with the main mass.

The secondary glass may be added by introducing one or more glass rods into the molten main mass.

According to a preferred mode, the secondary glass is added to the main glass just before the latter exudes through the outlet orifices of the melting receptacle.

Some modes of carrying out my invention will now be described more fully with reference to the accompanying drawing.

Figure 1:
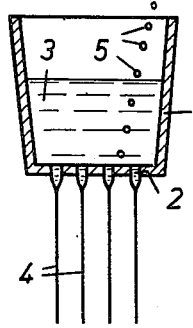
Figure 2:
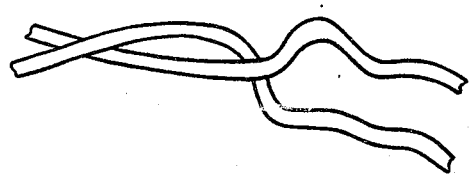

In the drawing, Figs. 1, 3, 4, and 5, respectively, show partial diagrammatic sections of some forms of devices adapted to be used in practicing the invention, and Fig. 2 is an illustration on a largely magnified scale of curled glass fibers made in accordance with the new method.

Referring first to Fig. 1, the numeral 1 designates a melting receptacle provided with outlet orifices 2 and holding a supply of molten glass 3. The streams of molten glass delivered through the orifices 2 are formed into fibers or threads 4.

According to the invention, small quantities of a glass mass 5 having a coefficient of expansion different from that of the glass 3 is introduced either continuously or intermittently into the receptacle 1, preferably near one of the walls of the same. The glass mass 5 is added in liquid or solid state and in any suitable form, such as in the form of drops, of liquid streams, of pearls, of pieces or bits of glass, or of glass rods.

Instead of adding glass, the basic constituents of glass such as alkaline compounds, acids such as borax, alkaline earths, metal oxides, and similar substances may be introduced into the mass of main glass.

The molten glass in the receptacle in flowing to and through the outlet orifices carries with it the added glass in an irregular manner so that the streams of glass issuing through the orifices 2 are not homogeneous but have a varying composition in the area of their cross-section and have also successive cross sections of different compositions. In this way, fibers such as illustrated by Fig. 2, are obtained which have a very irregular and varying curl.

Figure 3:
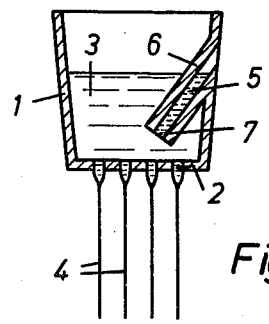

The device shown in Fig. 3 is more particularly adapted for preventing the two glasses from mixing to a homogeneous mass. With this device, the additional or secondary glass mass is introduced into the melting receptacle 1 by means of a separate feed duct 6 which extends from the outside into the interior of the receptacle and lies with its delivery end 7 in the neighbourhood of the outlet orifices 2 of the melting receptacle 1. Therefore, the additional glass mass only joins the main mass a short distance above the orifices 2 and the threads formed by the streams delivered through the orifices 2 have inherent tensions and curl irregularly. If desired, the orifices 7 and 2 may be arranged in concentric or any other suitable relation.

Figure 4:
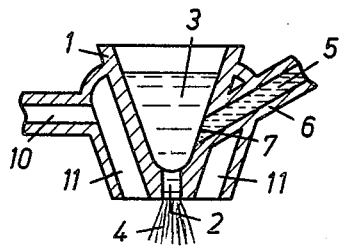

Fig. 4 shows a device similar to that of Fig. 3 but constructed for the production of a bundle of fibers by means of gaseous blasts. The lower portion of the receptacle 1 is surrounded by an annular nozzle 11 to which gas under high pressure, such as steam, is supplied by a pipe 10 and blown by the nozzle concentrically around the stream of molten glass issuing through the orifice 2 in such a direction as to cause the stream to be atomized into a bundle of fine fibers.

Figure 5:
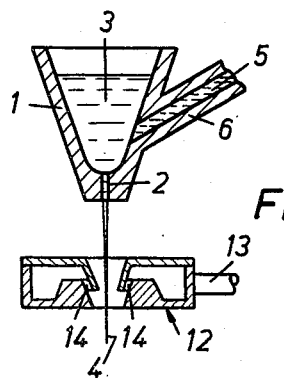

With the modification according to Fig. 5, the melting receptacle 1 holding the molten mass of main glass is provided with a duct 6 for the supply of the additional glass, as in Figs. 3 and 4. The bottom of the receptacle has a series of small outlet orifices 2 through which thin streams of molten glass are delivered. These streams pass through a blower 12 to which high-pressure steam or other gas is supplied by a pipe 13. By means of this blower blasts of the steam supplied are directed by nozzles 14 towards the streams of molten glass substantially in the direction of the flow of the streams which are attenuated by the blasts into fine fibers. Method and means for drawing glass fibers as described by means of gaseous blasts are fully disclosed in the British patent to Triggs No. 428,720. The fibers or threads 4 made by the device of Fig. 5 also possess the desired irregular curl due to the introduction into the main glass mass 3 of the additional glass 5 with different coefficients of expansion through the duct 6.

Artificial mineral fibers of the character produced by this invention can be worked on ordinary textile machines, mixed with other mineral or organic fibers and manufactured into roving, yarns and woven, knitted or plaited textile fabrics.

It will be understood that the invention is not limited to the manufacture of curled fibers from glass, but is also applicable to the manufacture of fibers from other minerals adapted to be worked and treated in like manner.

Having thus described my invention, what I claim as new and desire to secure by Letters-Patent is:

1. A method of making artificial mineral fibers which comprises providing a supply of molten glass, delivering portions of molten glass from this supply and converting them into fibers, introducing into the said supply of molten glass small quantities of a second glass mass having a coefficient of expansion different from that of the first said glass, the point of introduction of said second glass mass being remote from the point of delivery of the supply of molten glass, whereby the different glasses intermix sufficiently to provide unitary finished fibers, and effecting the addition of the secondary glass in such a manner as to constantly vary the ratio of mixture of the two glasses, so as to produce fibers having an irregular curl.

2. A method of making artificial mineral fibers which comprises providing a supply of molten glass, continuously introducing into this supply small quantities of a second glass having a coefficient of expansion different from that of the first-said glass, delivering portions of the mixture of the two glasses from the said supply at a point removed from the place of introduction of said second glass, whereby the different glasses intermix sufficiently to provide unitary finished fibers, and drawing these portions into fibers.

3. A method of making artificial mineral fibers which comprises providing a supply of molten glass, intermittently introducing into this supply small quantities of a second glass having a coefficient of expansion different from that of the first-said glass, delivering portions of the mixture of the two glasses from the said supply at a point removed from the place of introduction of said second glass, whereby the different glasses intermix sufficiently to provide unitary finished fibers, and drawing these portions into fibers.

4. A method of making artificial mineral fibers which comprises providing a supply of molten glass, introducing into this supply small quantities of a second glass in liquid state having a coefficient of expansion different from that of the first-said glass, delivering portions of the mixture of the two glasses from the said supply at a point removed from the place of introduction of said second glass, whereby the different glasses intermix sufficiently to provide unitary finished fibers, and drawing these portions into fibers.

5. A method of making artificial mineral fibers which comprises providing in a receptacle provided with a delivery opening in its bottom a molten supply of glass, introducing small quantities of a glass having a coefficient of expansion different from that of the first-said glass into the supply of the latter near one of the side walls of the receptacle and at a point removed from said delivery opening to produce an incomplete mixing of the two glasses as they flow together toward the delivery opening, whereby the different glasses intermix sufficiently to provide unitary finished fibers, flowing portions of the mixed glasses from the said delivery opening and drawing these portions into fibers.

6. Apparatus for producing glass fibers comprising in combination with means for attenuating molten glass into fine fibers, a container for a supply body of molten glass, said container comprising side and bottom walls and having a plurality of orifices in said bottom wall arranged in a row for delivering said glass in a plurality of adjacent streams, said container provided with an opening suitable for introducing glass making material, and at least one of said side walls being provided below the normal level of molten glass with a second opening spaced upwardly from said bottom wall but adjacent one end of said row of orifices and adapted to introduce into said supply body, glass having a different coefficient of expansion to thereby vary the coefficient of expansion of the glass in said streams and produce fibers having an irregular curl.

7. Apparatus for producing glass fibers comprising a container for a supply body of molten glass, said container comprising side and bottom walls and having an opening for the introduction of glass-making material and a plurality of adjacent orifices in said bottom wall arranged in a row for delivering said glass in a plurality of adjacent streams, and at least one of the said side walls provided with a passage inclined downwardly and in communication at its lower end with the interior of the receptacle at a point below the normal level of molten glass therein and spaced from the orifices but adjacent one end of the row of orifices, said passage being provided at its upper end with an opening through which glass material may be fed into said passage.

8. The method of producing glass fibers which comprises providing a supply body of molten glass in a receptacle provided with a plurality of outlet orifices arranged in a row, introducing small quantities of a glass having a coefficient of expansion different from that of the first named glass into the supply body in the neighborhood of the orifices and adjacent one end of the row of orifices, whereby the different glasses are intermixed irregularly to an extent providing unitary finished fibers but short of that providing a homogeneous glass for the fibers, delivering portions of said irregularly mixed glasses through said orifices, and drawing the delivered portions into fibers in which the composition of the glass varies along the length and through the cross-section of the fibers.

9. A method of making artificial mineral fibers which comprises providing a molten supply of glass in a receptacle having outlet orifices, introducing small quantities of a glass having a coefficient of expansion different from that of the first-said glass into the supply in the neighborhood of the outlet orifices in a manner to intermix the different glasses irregularly but to an extent sufficient to provide unitary finished fibers, delivering portions of the intermixed glasses through the outlet orifices of said receptacle, and attenuating these delivered portions into fibers.

GEDEON von PAZSICZKY.